US012459045B2

(12) United States Patent
Yamada et al.

(10) Patent No.: US 12,459,045 B2
(45) Date of Patent: Nov. 4, 2025

(54) WELDING DEVICE FOR NON-CIRCULAR PLATE AND PRODUCING METHOD FOR NON-CIRCULAR PLATE STRUCTURE

(71) Applicant: MAYEKAWA MFG. CO., LTD., Tokyo (JP)

(72) Inventors: Keisuke Yamada, Tokyo (JP); Tetsuji Terada, Tokyo (JP); Daisuke Miyazaki, Tokyo (JP); Hideki Shudai, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 985 days.

(21) Appl. No.: 17/612,455

(22) PCT Filed: Jun. 11, 2019

(86) PCT No.: PCT/JP2019/023031
§ 371 (c)(1),
(2) Date: Nov. 18, 2021

(87) PCT Pub. No.: WO2020/250295
PCT Pub. Date: Dec. 17, 2020

(65) Prior Publication Data
US 2022/0234127 A1    Jul. 28, 2022

(51) Int. Cl.
*B23K 9/00* (2006.01)
*B23K 9/167* (2006.01)
*B23K 101/14* (2006.01)

(52) U.S. Cl.
CPC ............ *B23K 9/0026* (2013.01); *B23K 9/167* (2013.01); *B23K 2101/14* (2018.08)

(58) Field of Classification Search
None
See application file for complete search history.

(56) References Cited

U.S. PATENT DOCUMENTS 3,924,092 A * 12/1975 Lessmann ............ B23K 9/0737
219/76.11
4,839,489 A *  6/1989 Dyer ...................... B23K 9/325
219/72

(Continued)

FOREIGN PATENT DOCUMENTS

EP    3456458 A1    3/2019
JP    S58122184 A *  7/1983

(Continued)

OTHER PUBLICATIONS

JP-S58122184-A (Noto, Kouji) Jul. 20, 1983 [retrieved on Jan. 18, 2025]. Retrieved from Espacenet Database, translation by EPO and Google. (Year: 1983).*

(Continued)

*Primary Examiner* — Ibrahime A Abraham
*Assistant Examiner* — Franklin Jefferson Wang
(74) *Attorney, Agent, or Firm* — ROSSI, KIMMS & McDOWELL LLP

(57) ABSTRACT

A welding device for a non-circular plate according to an embodiment includes a chuck for gripping and rotatably supporting a plurality of laminated non-circular plates, a welding torch for welding outer peripheral edge portions of the plurality of laminated non-circular plates, a stationary shield box, and a movable shield box which is position-adjustable with respect to the welding torch so as to form a shield space surrounding the welding torch with the stationary shield box.

18 Claims, 10 Drawing Sheets

(56) References Cited

U.S. PATENT DOCUMENTS

| | | | |
|---|---|---|---|
| 5,084,603 A | 1/1992 | Bernuchon et al. | |
| 5,393,948 A * | 2/1995 | Bjorkman, Jr. ........ | B23K 9/325 |
| | | | 219/136 |
| 5,393,949 A * | 2/1995 | Stricklen ............... | B23K 9/325 |
| | | | 219/74 |
| 2005/0173379 A1* | 8/2005 | Ireland .................. | B23K 9/295 |
| | | | 219/75 |
| 2013/0068745 A1* | 3/2013 | Agosti .................... | B23K 9/32 |
| | | | 219/137.9 |
| 2014/0144896 A1 | 5/2014 | Einav | |
| 2017/0014936 A1* | 1/2017 | Pernodet ............... | B23K 9/235 |
| 2019/0151977 A1 | 5/2019 | Kitagawa | |
| 2019/0232410 A1 | 8/2019 | Kitagawa | |

FOREIGN PATENT DOCUMENTS

| | | | |
|---|---|---|---|
| JP | S6478677 A | 3/1989 | |
| JP | H0760445 A | 3/1995 | |
| JP | H1190685 A | 4/1999 | |
| JP | 2014524840 A | 9/2014 | |
| JP | 5690532 B2 | 3/2015 | |
| WO | 2018066136 A1 | 4/2018 | |
| WO | WO-2018066137 A1 * | 4/2018 | ............. B23K 37/02 |

OTHER PUBLICATIONS

WO-2018066137-A1 (Kitagawa, Hisashi) Apr. 12, 2018 [retrieved on Jan. 18, 2025]. Retrieved from Espacenet Database, translation by EPO and Google. (Year: 2018).*

English translation of Written Opinion issued in Intl. Appln. No. PCT/JP2019/023031 mailed Sep. 3, 2019, previously cited in IDS filed Nov. 18, 2021.

International Preliminary Report on Patentability issued in Intl. Appln. No. PCT/JP2019/023031 mailed Dec. 23, 2021. English translation provided.

Extended European Search Report issued in European Appln. No. 19933030.9 mailed on May 16, 2022.

"Database WPI Week 198747" Thomas Scientific, Apr. 15, 1987. SU Patent Publication No. SU1303317 with English machine translation attached. Cited in NPL 1.

Office Action issued in Japanese Appln. No. 2021-525436 mailed on Nov. 15, 2022. English machine translation provided.

International Search Report issued in Intl. Appln. No. PCT/JP2019/023031 mailed Sep. 3, 2019. English translation provided.

Written Opinion issued in Intl. Appln. No. PCT/JP2019/023031 mailed Sep. 3, 2019.

\* cited by examiner

WELDING DEVICE FOR NON-CIRCULAR PLATE AND PRODUCING METHOD FOR NON-CIRCULAR PLATE STRUCTURE

TECHNICAL FIELD

The present disclosure relates to a welding device for a non-circular plate and a producing method for a non-circular plate structure.

BACKGROUND

Patent Document 1 discloses the configuration of a plate structure used as a heat exchanging part provided for a shell-and-plate type heat exchanger. The plate structure is formed by laminating a number of plates each having the same outer shape and two refrigerant flow holes. As shown in FIG. 13 of Patent Document 1, a producing method for the plate structure first includes joining a pair of plates at peripheral edge portions of the refrigerant flow holes to form a pair plate. Next, the method includes laminating and arranging a plurality of pair plates, and joining outer peripheral edges of the plates arranged to face each other between the pair plates, thereby producing a plate structure constituted by at least two sets of pair plates. When the produced plate structure is used as the above-described heat exchanging part, flow paths for a first refrigerant flowing on a front-surface side of each plate and a second refrigerant flowing on a back-surface side are formed such that these refrigerants exchange heat.

Patent Document 2 discloses a welding device for producing a plate structure by using a non-circular plate whose curvature of an outer peripheral edge is different in the circumferential direction. The welding device welds with torch the outer peripheral edges of a plurality of laminated non-circular plates while rotating the respective plates in the circumferential direction. In the case of the non-circular plate, since the curvature of the outer peripheral edge is different in the circumferential direction, outside air is likely to enter a welded part, making it difficult to always hold a gas shielding effect by a shielding gas. The welding device disclosed in Patent Document 2 obtains the gas shielding effect by a shield nozzle including a stationary nozzle and a movable nozzle capable changing orientation.

CITATION LIST

Patent Literature

Patent Document 1: JP5690532B (FIG. 13)
Patent Document 2: WO2018-066137A1

SUMMARY

Technical Problem

In the welding device disclosed in Patent Document 2, the shield nozzle is disposed only downstream of the welded part in a rotation direction of the plurality of laminated plates, and thus the gas shielding effect may be decreased upstream of the welded part. Further, outside air may enter the welded part from between the stationary nozzle and the movable nozzle even downstream in the rotation direction of a plate laminated body, and the gas shielding effect may be decreased by the incoming air.

An object of an embodiment according to the present disclosure is to improve the gas shielding effect on the welded part by the shielding gas, when a plurality of non-circular plates whose outer shape is not a perfect circle are laminated and the outer peripheral edges of the adjacent non-circular plates are welded.

Solution to Problem (1) A welding device for a non-circular plate according to an embodiment of the present disclosure includes a chuck for gripping and rotatably supporting a plurality of laminated non-circular plates, a welding torch for welding outer peripheral edges of adjacent non-circular plates among the plurality of laminated non-circular plates, a stationary shield box, and a movable shield box which is position-adjustable with respect to the welding torch so as to form a shield space surrounding the welding torch with the stationary shield box.

In the present specification, a "non-circular plate" refers to not a plate whose outer peripheral edge is composed by an arc having the same curvature in the circumferential direction like a perfect circle, but refers to a plate of a shape having a curvature which is different in the circumferential direction. For example, the non-circular plate refers to a plate of a shape whose distance from a rotation center to the outer peripheral edge is different in the circumferential direction when rotated by the chuck, like an ellipsoidal plate. For instance, the plate shape is not limited to a shape whose outer peripheral edge is composed of only arc, such as an ellipse, but may include a shape other than arc in a part of the outer peripheral edge. Further, "outer peripheral edges of adjacent non-circular plates" may simply be referred to as "adjacent plate outer peripheral edges", and an "outer peripheral edge of a non-circular plate" may simply be referred to as a "plate outer peripheral edge".

In welding, the plurality of laminated non-circular plates are gripped from both sides by the chuck and rotated. The plurality of gripped non-circular plates are welded at the adjacent plate outer peripheral edges by the welding torch while being rotated, thereby producing a plate laminated body. The plate laminated body can increase the number of plates by sequentially welding new plates. With the above configuration (1), it is possible to form a wide shield space surrounding the welding torch, by the above-described stationary shield box and the above-described movable shield box. Thus, for the welded part, it is possible to improve a gas shielding effect in an entire region in the periphery of the welded part including an upstream region in the rotation direction of the plurality of laminated non-circular plates. Further, since the movable shield box is position-adjustable with respect to the welding torch, even if a curvature of the plate outer peripheral edge greatly changes from an outer peripheral edge of the welded part in a region surrounded by the movable shield box, it is possible to dispose the movable shield box in proximity to the outer peripheral edge. Therefore, since it is possible to improve the gas shielding effect by the movable shield box, it is possible to prevent a welding defect due to occurrence of blowhole, welding scale, or the like.

(2) In an embodiment, in the above configuration (1), the stationary shield box is disposed so as to surround the welding torch, and the movable shield box is disposed on an outer side of the stationary shield box relative to the welding torch.

With the above configuration (2), it is possible to form the wide shield space in the periphery of the welding torch by the stationary shield box and the movable shield box, as well as it is possible to suppress that outside air enters the shield space by the movable shield box disposed on the outer side of the stationary shield box. Thus, it is possible to improve the gas shielding effect on the welded part.

(3) In an embodiment, in the above configuration (2), a pair of movable shield boxes are, respectively, disposed upstream and downstream of the stationary shield box in a rotation direction of the plurality of laminated non-circular plates.

With the above configuration (3), it is possible to block the outside air that enters the welded part accompanied by the rotation of the plurality of laminated non-circular plates with the movable shield box disposed upstream in the rotation direction of the non-circular plates, as well as it is possible to ensure the wide shield space downstream of the welded part with the movable shield box disposed downstream in the rotation direction.

Note that "the rotation direction of the plurality of laminated non-circular plates" may simply be referred to as "the rotation direction".

(4) In an embodiment, in the above configuration (3), each of the pair of movable shield boxes is configured to independently be position-adjustable with respect to the welding torch.

With the above configuration (4), even if the curvature of the plate outer peripheral edge is different between upstream and downstream of the welded part in the rotation direction, the pair of movable shield boxes are independently position-adjustable, and thus can be disposed close to the outer peripheral edge upstream and downstream. Thus, it is possible to improve the gas shielding effect by the respective movable shield boxes.

(5) In an embodiment, in any one of the above configurations (1) to (4), the movable shield box is mounted on the stationary shield box to be rotatable around a support shaft disposed along a direction orthogonal to a rotation direction of the plurality of laminated non-circular plates.

With the above configuration (5), since the movable shield box is mounted rotatably around the above-described support shaft, the movable shield box is position-adjustable in a direction getting close to or away from the plate outer peripheral edge. Thus, the movable shield box can always be disposed in proximity to the plate outer peripheral edge in the entire circumferential region, making it possible to improve the gas shielding effect by the movable shield box.

(6) In an embodiment, in any one of the above configurations (1) to (5), an interior space of the stationary shield box and an interior space of the movable shield box form a continuous space.

With the above configuration (6), it is possible to form the wide shield space combining the interior spaces of the stationary shield box and the movable shield box in the periphery of the welding torch. Thus, it is possible to improve the gas shielding effect in the periphery of the welded part.

(7) In an embodiment, in the above configuration (6), the movable shield box opens to the stationary shield box and is closed on an opposite side to the stationary shield box.

With the above configuration (7), since the stationary shield box and the movable shield box internally form the continuous space, it is possible to form the wide shield space separated from the outside in the periphery of the welding torch. Thus, it is possible to improve the gas shielding effect in the periphery of the welded part.

(8) In an embodiment, in any one of the above configurations (1) to (7), the welding device for the non-circular plate is configured such that an inner surface of the movable shield box facing the plurality of laminated non-circular plates is formed into an arc shape, and a curvature radius of the inner surface is substantially the same as a curvature radius of a portion having a maximum curvature radius of the outer peripheral edges of the plurality of laminated non-circular plates.

With the above configuration (8), since the curvature radius of the inner surface of the movable shield box coincides with the maximum curvature radius of the plate outer peripheral edge, it is possible to minimize a gap between the plate outer peripheral edge and the inner surface of the movable shield box in the entire circumferential region of the outer peripheral edge. Thus, it is possible to improve the gas shielding effect by the movable shield box.

(9) In an embodiment, in any one of the above configurations (1) to (8), the welding device for the non-circular plate includes an actuator for enabling position adjustment of the movable shield box with respect to the welding torch.

With the above configuration (9), by the above-described actuator, the movable shield box can always be disposed proximately over the entire circumference of the plate outer peripheral edge. Thus, it is possible to improve the gas shielding effect by the movable shield box.

(10) In an embodiment, in the above configuration (9), the welding device for the non-circular plate includes a control part for controlling an operation of the actuator based on a rotation angle of the chuck.

With the above configuration (10), since the operation of the actuator is controlled by the above-described control part based on the rotation angle of the chuck, the movable shield box can always be disposed proximately over the entire circumference of the plate outer peripheral edge. Thus, it is possible to improve the gas shielding effect by the movable shield box.

(11) In an embodiment, in any one of the above configurations (1) to (10), one of the stationary shield box and the movable shield box is configured to be insertable into the other.

With the above configuration (11), the movable shield box can undergo position adjustment without interfering with the stationary shield box, and even if the movable shield box moves relatively to the stationary shield box, the gap where outside air enters is not formed between the stationary shield box and the movable shield box.

(12) In an embodiment, in the above configuration (11), the movable shield box is mounted on the stationary shield box to be rotatable around a support shaft disposed along a direction orthogonal to a rotation direction of the plurality of laminated non-circular plates, and at least a part of the movable shield box is configured to be insertable into the stationary shield box, and at least a part of the movable shield box is formed into an arc shape centered on the support shaft.

With the above configuration (12), since the section of the movable shield box inserted into the stationary shield box is formed into the arc shape centered on the above-described support shaft, the movable shield box inserted into the stationary shield box is always maintained at a certain distance from the above-described support shaft. Therefore, it is possible to minimize the gap between the stationary shield box and the movable shield box, making it possible to suppress that outside air enters from between the stationary shield box and the movable shield box.

(13) In an embodiment, in any one of the above configurations (1) to (12), the stationary shield box and the movable shield box are each provided with a shielding gas supply nozzle.

With the above configuration (13), it is possible to uniquely adjust and supply shielding gas amounts needed for the stationary shield box and the movable shield box, respectively. Thus, it is possible to improve the gas shielding effect by the stationary shield box and the movable shield box.

(14) In an embodiment, in any one of the above configurations (1) to (13), the chuck supports the plurality of laminated non-circular plates in a horizontal position, and the welding torch is disposed above the plurality of laminated non-circular plates and configured to be able to perform downward welding.

When the welding torch is in a horizontal position and performs welding in the horizontal position, a subtle disturbance such as sag is likely to occur in a welding bead under the influence of gravity, which is likely to cause poor welding. To cope therewith, with the above configuration (14), since the welding torch can perform downward welding on the plurality of laminated non-circular plates, it is possible to resolve disturbance in the welding bead under the influence of gravity.

(15) A producing method for a non-circular plate structure according to an embodiment includes a positioning step of performing positioning by laminating at least two sets of pair plates, each of which is constituted by a pair of non-circular plates joined such that outer peripheral edges thereof are superimposed in a front view, such that the outer peripheral edges of the non-circular plates are butted between the two sets of pair plates, a welding step of welding, with a welding torch, the outer peripheral edges butted to each other, while rotating the at least two sets of pair plates in a circumferential direction of the pair plates, and a shield step of shielding a periphery of the welding torch by a stationary shield box for the welding torch and a movable shield box which is position-adjustable with respect to the welding torch, in the welding step.

With the above method (15), during welding, it is possible to form a wide shield space surrounding the welding torch, by the stationary shield box and the movable shield box. Thus, it is possible to improve the gas shielding effect in the entire region in the periphery of the welded part including the upstream region of the welded part in the rotation direction. Further, since the movable shield box is position-adjustable with respect to the welding torch, performing position adjustment on the movable shield box in accordance with the curvature of the plate outer peripheral edge, it is possible to dispose the movable shield box in proximity to the plate outer peripheral edge over the entire circumference of the plate outer peripheral edge. Thus, it is possible to improve the gas shielding effect.

Advantageous Effects

According to some embodiments, it is possible to improve a gas shielding effect by a shielding gas in a wide region in the periphery of a welded part, when outer peripheral edges of adjacent plates among a plurality of laminated non-circular plates are welded. Therefore, it is possible to suppress a welding defect due to occurrence of blowhole or the like.

DETAILED DESCRIPTION

Figure 1:
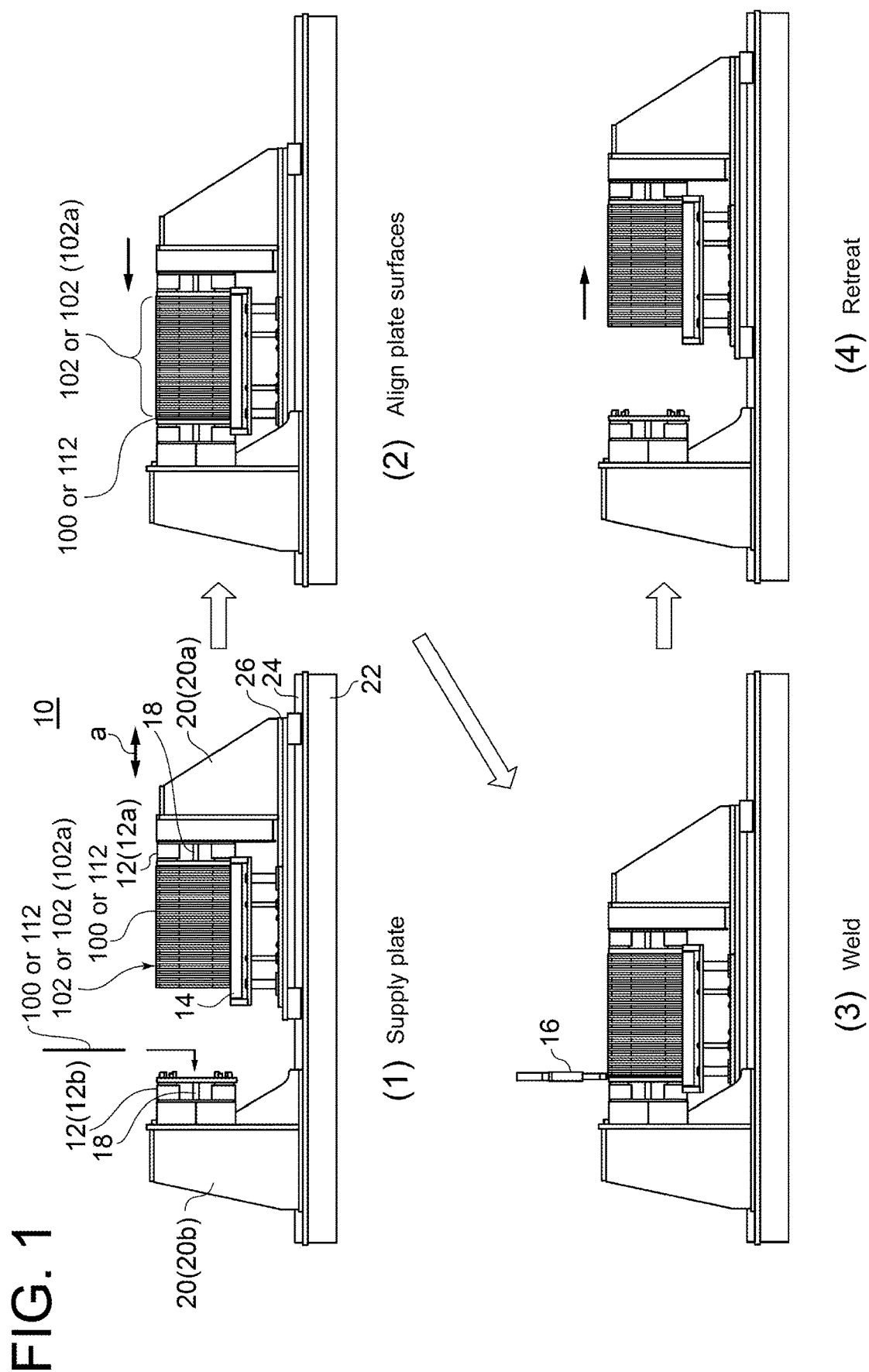
FIG. 1 is an explanatory diagram showing an operation procedure of a welding device according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
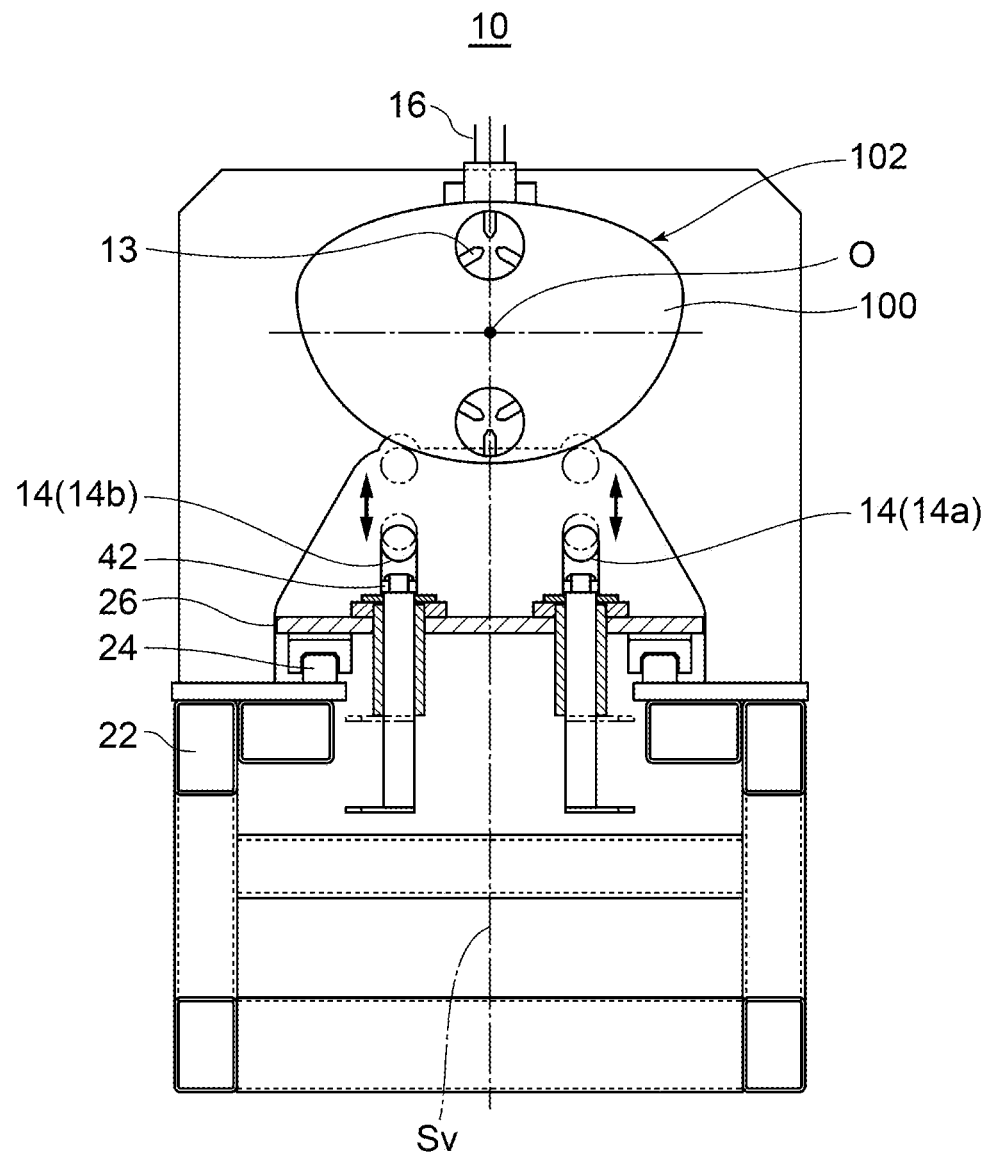
FIG. 2 is a side view of the welding device according to an embodiment.
Figure 3:
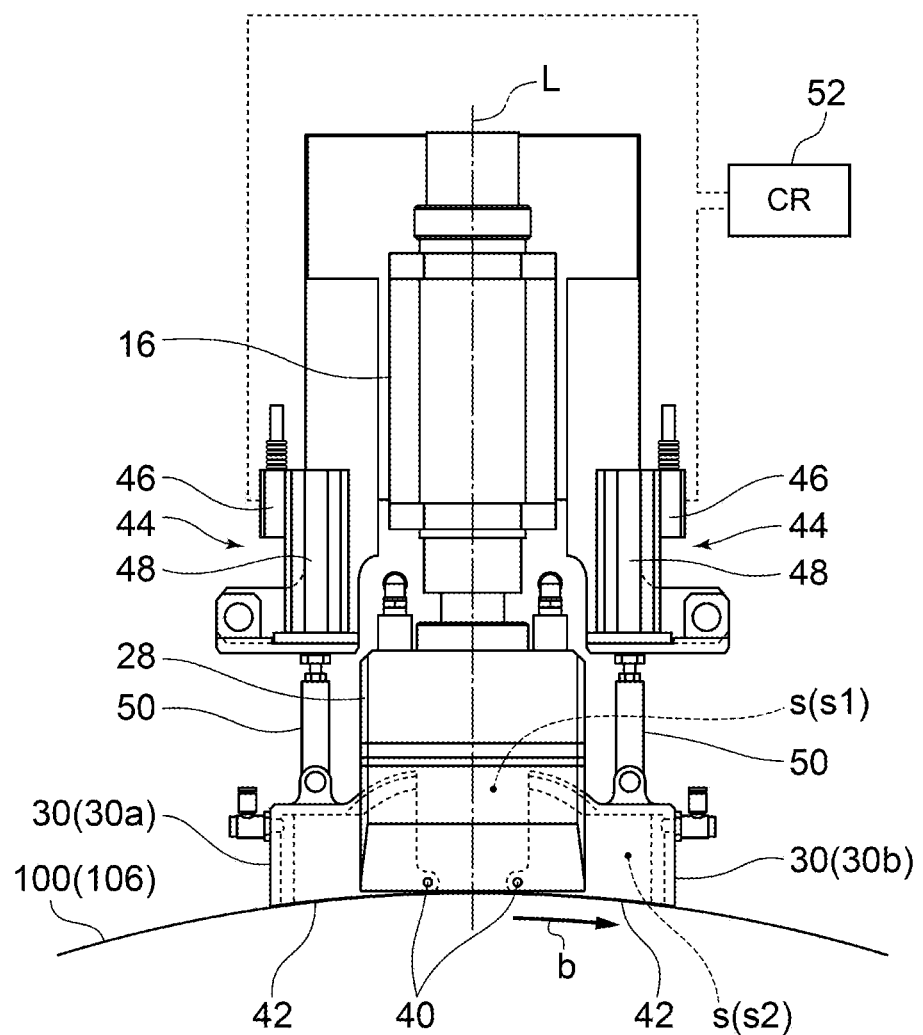
FIG. 3 is a front view of a welding torch composing the above-described welding device.
Figure 4:
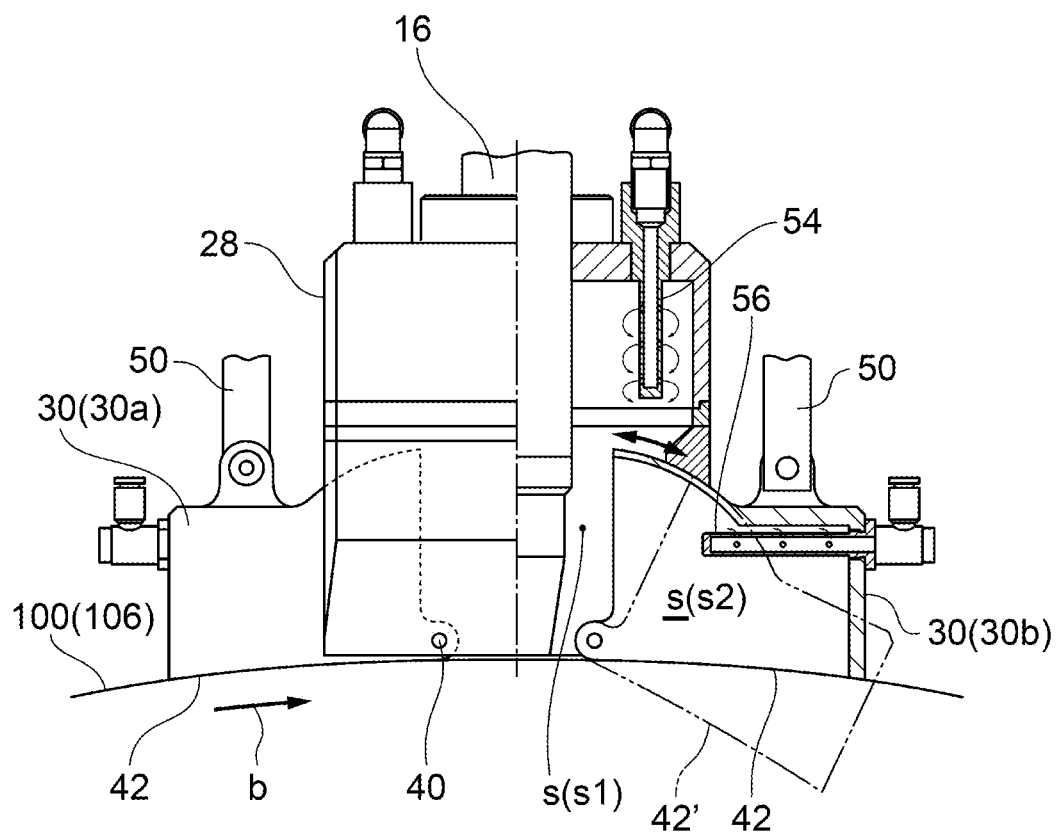
FIG. 4 is an enlarged front view showing a part of the above-described welding torch by a cross-section.
Figure 5:
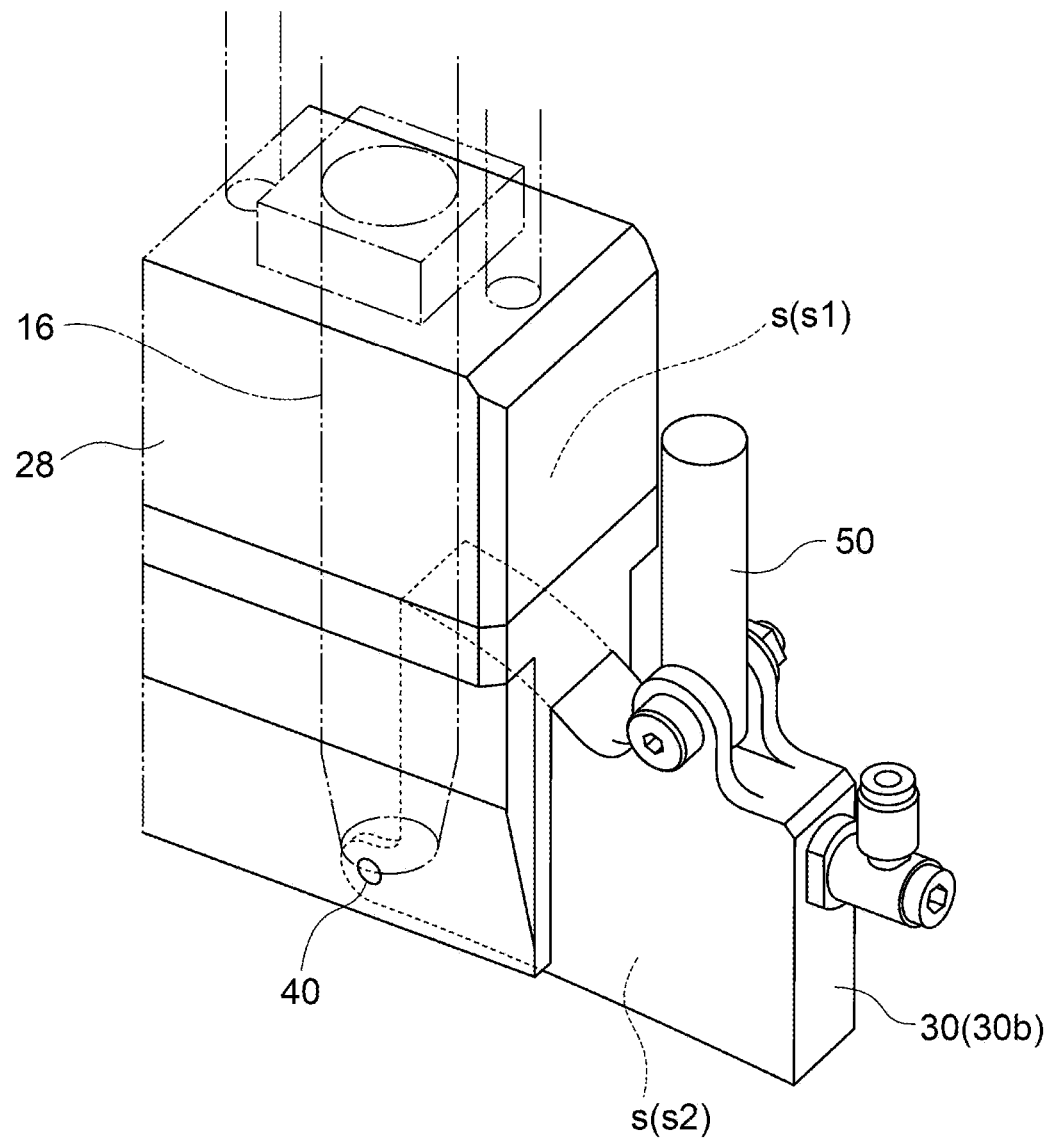
FIG. 5 is a perspective view of the above-described welding torch.

FIG. 1 is an explanatory diagram showing an operation procedure of a welding device 10 for a non-circular plate according to an embodiment. FIG. 2 is a side view of the welding device 10. FIG. 3 is a front view of a welding torch for the welding device 10, FIG. 4 is an enlarged front view showing a part of the same by a cross-section, and FIG. 5 is a perspective view of the same. As shown in FIGS. 1 and 2, the welding device 10 includes a chuck 12 for gripping a plurality of laminated non-circular plates 100 from both sides in a lamination direction and for rotatably supporting the plurality of non-circular plates, and a welding torch 16 for welding adjacent plate outer peripheral edges of the plurality of non-circular plates 100 gripped by the chuck 12. The chuck 12 rotates about the axis of a rotational shaft 18 (a rotation center O in FIG. 2) along the lamination direction of the non-circular plates 100 and rotates the plurality of laminated non-circular plates 100.

As shown in FIGS. 3 and 4, the welding device 10 includes a stationary shield box 28 and a movable shield box 30. The movable shield box 30 is configured to be position-adjustable with respect to the welding torch 16 so as to form a shield space s surrounding the welding torch 16 with the stationary shield box 28.

In welding, the plurality of laminated non-circular plates 100 are gripped from both sides by the chuck 12 and rotated, and the adjacent plate outer peripheral edges are welded by the welding torch 16 while being rotated. Thus, the new non-circular plates 100 are sequentially welded with respect to a non-circular plate laminated body 102 (may simply be referred to as the "laminated body 102", hereinafter) including the at least two non-circular plates 100 by using the welding device 10, making it possible to increase the number of non-circular plates of the laminated body 102. Further, by the stationary shield box 28 and the movable shield box 30, it is possible to form the wide shield space s (a shield space combining an interior space s (s1) of the stationary shield box 28 and an interior space s (s2) of the movable shield box 30) surrounding the welding torch 16, during welding. Thus, for the welded part, it is possible to improve a gas shielding effect in an entire region in the periphery of the welded part including an upstream region in the rotation direction. Further, since the movable shield box 30 is position-adjustable with respect to the welding torch 16, even if a curvature of the plate outer peripheral edge greatly changes from an outer peripheral edge of the welded part in a region surrounded by the movable shield box 30, it is possible to dispose the movable shield box 30 in proximity to the plate outer peripheral edge. Therefore, since it is possible to improve the gas shielding effect by the movable shield box 30, it is possible to prevent a welding defect due to occurrence of blowhole or the like.

The laminated body 102 produced through the above-described welding process is used as, for example, a heat exchanging part of a shell-and-plate type heat exchanger. FIG. 1 also shows a producing process for a non-circular plate structure 102 (102*a*) (may simply be referred to as the "structure 102 (102*a*)", hereinafter) produced by welding the outer peripheral edges of the adjacent non-circular plates 100 among the plurality of pair plates, as an embodiment of the laminated body 102.

Figure 6:
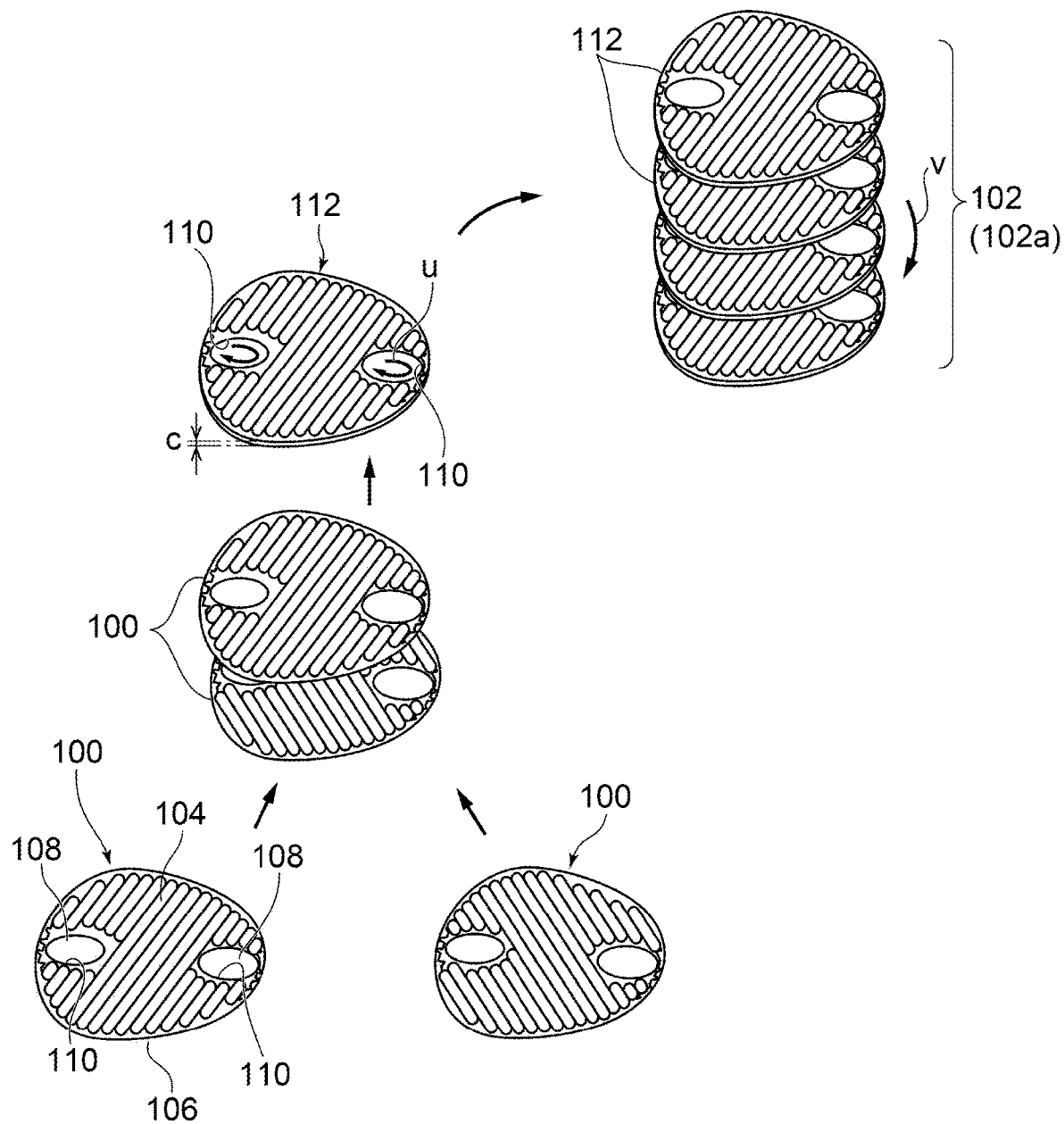
FIG. 6 is a process drawing showing a producing process for a non-circular plate structure according to an embodiment.

FIG. 6 shows a producing process for the structure 102 (102*a*). In each of the plurality of non-circular plates 100 constituting the structure 102 (102*a*), protrusions and recesses 104 having a waveform cross-section are formed. In the non-circular plate 100, two refrigerant flow holes 108 whose phases are different by 180 degrees with reference to the center of a plate surface are formed in the vicinity of an outer peripheral edge 106. The outer peripheral edge 106 and inner peripheral edges 110 forming the refrigerant flow holes 108 are formed in a narrow annular flat surface connected to the protrusions and recesses 104. A plate-like body forming a flat surface of the outer peripheral edge 106 and plate-like bodies forming flat surfaces of the inner peripheral edges 110 have a height difference by a step between the protrusion and the recess of the protrusions and recesses 104.

First, the two non-circular plates 100 are superimposed with back surfaces thereof being opposite to each other (with the protrusions or the recesses of the protrusions and recesses 104 being arranged back-to back), and the inner peripheral edges 110 of the two refrigerant flow holes 108 arranged to face each other are circumferentially welded as indicated by an arrow u, thereby producing a pair plate 112. At this time, between the outer peripheral edges 106 of the adjacent non-circular plates 100, a clearance c is formed which is twice the size of the step between the protrusion and the recess of the protrusions and recesses 104 formed in the non-circular plates 100. In the next step, a number of pair plates 112 are superimposed, the outer peripheral edges 106 of the adjacent pair plates 112 are brought into contact with each other, and a contact surface is circumferentially welded as indicated by an arrow v. The structure 102 (102*b*) is thus produced. The structure 102 (102*b*) is housed in a hollow container of the shell-and-plate type heat exchanger, and is immersed in a refrigerant stored in the hollow container.

As described above, the structure 102 (102*a*) is produced by alternately welding the inner peripheral edges 110 of the refrigerant flow holes 108 and the outer peripheral edges 106 of the plurality of non-circular plates 100 in the lamination direction. Consequently, on one surface side of each non-circular plate 100, a first flow path opened to an interior space of the above-described hollow container, and a second flow path closed with respect to the interior space of the hollow container and communicating with the refrigerant flow holes 108 are formed. Then, a first refrigerant flowing through the first flow path and a second refrigerant flowing through the second flow path can exchange heat via each non-circular plate 100.

In the embodiment shown in FIG. 2, the chuck 12 grips the inner peripheral edge 110 of the non-circular plate 100 with clicks 13. The laminated body 102 rotates about the rotation center O that coincides with the axis of the rotational shaft 18 along the lamination direction of the non-circular plates 100.

In an embodiment, as shown in FIG. 2, a support 14 is constituted by a support roller. Thus, since the support 14 can rotatably supports the laminated body 102, with the welding torch 16 fixed at a fixed position on the outer side of the laminated body 102, it is possible to easily weld the adjacent plate outer peripheral edges while rotating the laminated body 102.

In an embodiment, the above-described support roller is configured to be able to make a driven rotation in accordance with a rotation of the laminated body 102. Thus, the rotating laminated body 102 is supported easily.

In an embodiment, the support 14 is constituted by the first support 14 (14*a*) and the second support 14 (14*b*) disposed on both sides of a vertical surface Sv across the vertical surface Sv passing through the rotation center O of the chuck 12. The non-circular plate 100 is supported by the first support 14 (14*a*) and the second support 14 (14*b*), making it possible to stably support the laminated body 102.

In the non-circular plate 100, a distance from the rotation center O to the outer peripheral edge 106 is different in the circumferential direction. Thus, in an embodiment, the support 14 is configured to be able to adjust a support height in accordance with a rotation angle of the chuck 12. Thus, the chuck 12 can support the laminated body 102 while holding the rotation center O at the fixed position.

In an embodiment, as shown in FIG. 1, the chuck 12 is constituted by a pair of chucks 12 (12*a*, 12*b*) for gripping the laminated body 102 to be sandwiched from both sides in the axial direction. The pair of chucks 12 (12*a*, 12*b*) are mounted on stands 20 (20*a*, 20*b*), respectively. The stands 20 (20*a*, 20*b*) are disposed on a base 22, on an upper surface of the base 22, a rail 24 is disposed along a direction of an arrow a, and the one stand 20 (20*a*) is slidable on the rail 24. Further, the support 14 is supported by a common frame 26 with the stand 20 (20*a*), and is slidable on the rail 24 together with the stand 20 (20*a*). Thus, the pair of chucks 12 (12*a*) approaches the other chuck 12 (12*b*) to grip the laminated body 102 with the chuck 12 (12*b*), or separates from the other chuck 12 (12*b*), thereby being able to cancel gripping of the laminated body 102. A drive part (not shown) for rotating the chuck 12 (12a, 12b) is disposed in the stand 20 (20a, 20b).

In an embodiment, as shown in FIG. 5, the stationary shield box 28 is disposed so as to surround the welding torch 16. Further, the movable shield box 30 is disposed on the outer side of the stationary shield box 28 relative to the welding torch 16. It is possible to form the wide shield space s (s1+s2) in the periphery of the welding torch 16 by the stationary shield box 28 and the movable shield box 30, as well as it is possible to suppress that outside air enters the shield space s by the movable shield box 30 disposed on the outer side of the stationary shield box 28. Thus, it is possible to improve the gas shielding effect on the welded part.

In FIGS. 3 and 4, a direction of an arrow b indicates the rotation direction of the non-circular plate 100. In an embodiment, as shown in FIGS. 3 and 4, a pair of movable shield boxes 30 (30a, 30b) are, respectively, disposed upstream and downstream of the stationary shield box 28 in the rotation direction of the non-circular plate 100. Thus, it is possible to block the outside air that enters the welded part accompanied by the rotation of the non-circular plate 100 with the movable shield box 30 (30a) disposed upstream in the rotation direction, as well as it is possible to ensure the wide shield space s downstream of the welded part with the movable shield box 30 (30b) disposed downstream in the rotation direction.

Figure 7:
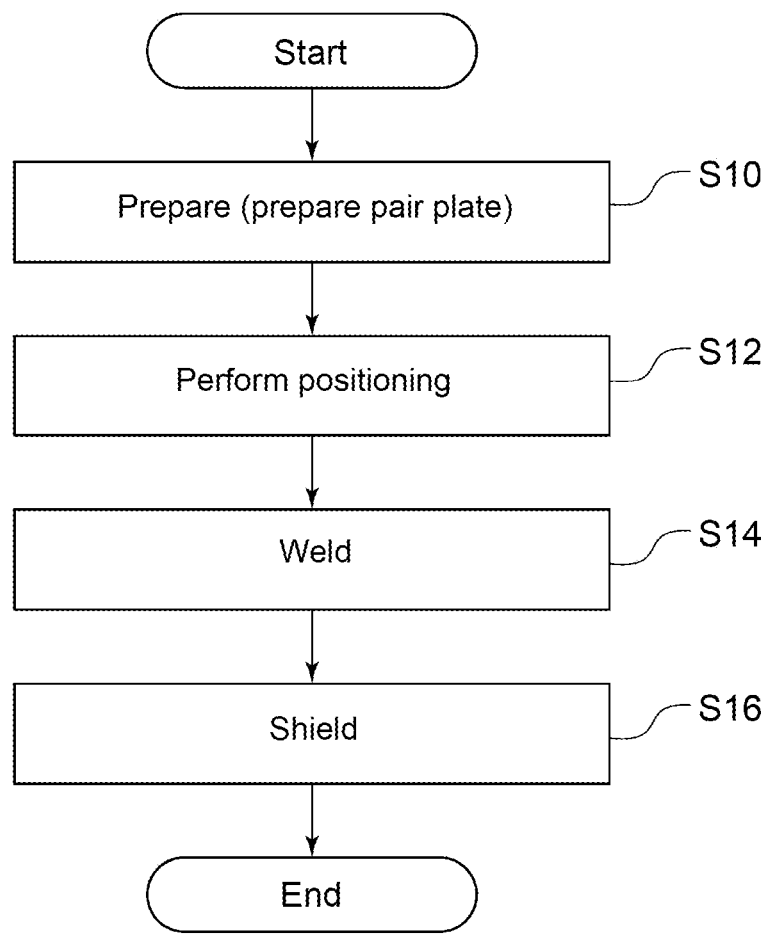
FIG. 7 is a flowchart showing a welding method for the non-circular plate structure according to an embodiment.

A producing method for the structure 102 (102a) according to an embodiment performs steps S10 to S16 shown in FIG. 7. First, in the preparation step S10, at least two sets of pair plates 112 are prepared. That is, as shown in FIG. 6, the inner peripheral edges 110 are joined in a state where the two non-circular plates 100 are in a positional relationship where the outer peripheral edges 106 are superimposed in a front view, thereby forming one set of pair plates 112. Next, the laminated body 102, which is positioned by laminating the two sets of pair plates 112 such that the outer peripheral edges of the adjacent non-circular plates 100 among the pair plates 112 are butted to each other, is gripped from both sides in the lamination direction (positioning step S12). The outer peripheral edges butted to each other are welded with the welding torch 16 while rotating the two sets of pair plates 112 gripped by the chuck 12 (12a, 12b) around the axis of the rotational shaft 18 (rotation center O) (welding step S14). In the welding step S14, the periphery of the welding torch 16 is shielded by the stationary shield box 28 surrounding the welding torch 16 and the movable shield box 30 which is position-adjustable with respect to the welding torch 16 (shield step S16).

With the above method, during welding, it is possible to form the wide shield space s (the space combining the interior space s (s1) of the stationary shield box 28 and the interior space s (s2) of the movable shield box 30) surrounding the welding torch 16. Thus, it is possible to improve the gas shielding effect in the entire region in the periphery of the welded part including the upstream region of the welded part in the rotation direction. Further, since the movable shield box 30 is position-adjustable with respect to the welding torch 16, with position adjustment in accordance with the curvature of the plate outer peripheral edge 106, it is possible to dispose the movable shield box 30 in proximity to the plate outer peripheral edge 106 over the entire circumference of the plate outer peripheral edge 106. Thus, it is possible to improve the gas shielding effect.

Figure 8:
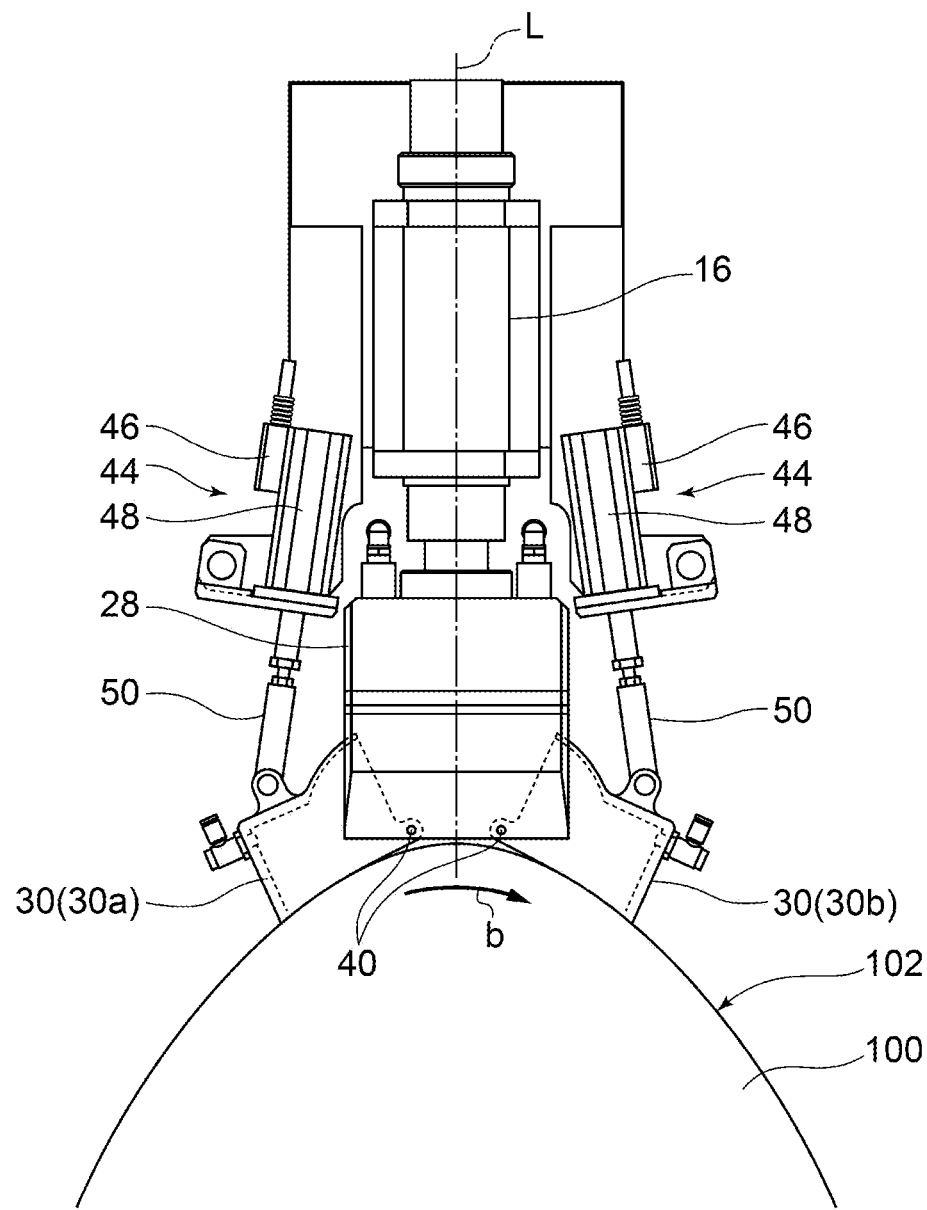
FIG. 8 is a front view showing an operating state of the above-described welding torch.

FIG. 8 shows the operation of the welding torch 16 during welding. As shown in FIG. 8, even if the curvature of the plate outer peripheral edge 106 changes in the circumferential direction, the position of the movable shield box 30 is adjusted in accordance with the curvature of the plate outer peripheral edge 106, making it possible to proximately dispose the movable shield box 30 in the entire circumferential region of the plate outer peripheral edge 106. Therefore, it is possible to improve the gas shielding effect by the movable shield box 30.

The producing direction for the structure 102 (102a) using the welding device 10 according to an embodiment will be described with reference to FIG. 1. In step (1), the structure 102 (102a), which includes the at least two sets of pair plates 112 constituted by the plurality of pair plates 112 and welded at the plate outer peripheral edges, has already been produced and is supported by the support 14. A new one set of pair plates 112 to be welded to the structure 102 (102a) is supplied thereto. At this time, the stand 20 (20a) is at a position retreated from the stand 20 (20b). In step (2), the stand 20 (20a) approaches the stand (20b) to position the pair plate 112 such that outer peripheral edges of the adjacent non-circular plates 100 among the pair plate 112 disposed in an end portion of the structure 102 (102a) are butted to each other.

In step (3), the welding torch 16 is disposed on the outer side of the plate outer peripheral edges butted to each other, and the welding torch 16 welds the entire circumference of the outer peripheral edges butted to each other while rotating the chuck 12 (12a, 12b) about the rotational shaft 18. After the end of welding, in step (4), gripping of the pair plate 112 by the chuck 12 (12b) is canceled, and the stand 20 (20a) is retreated from the stand 20 (20b).

Figure 9:
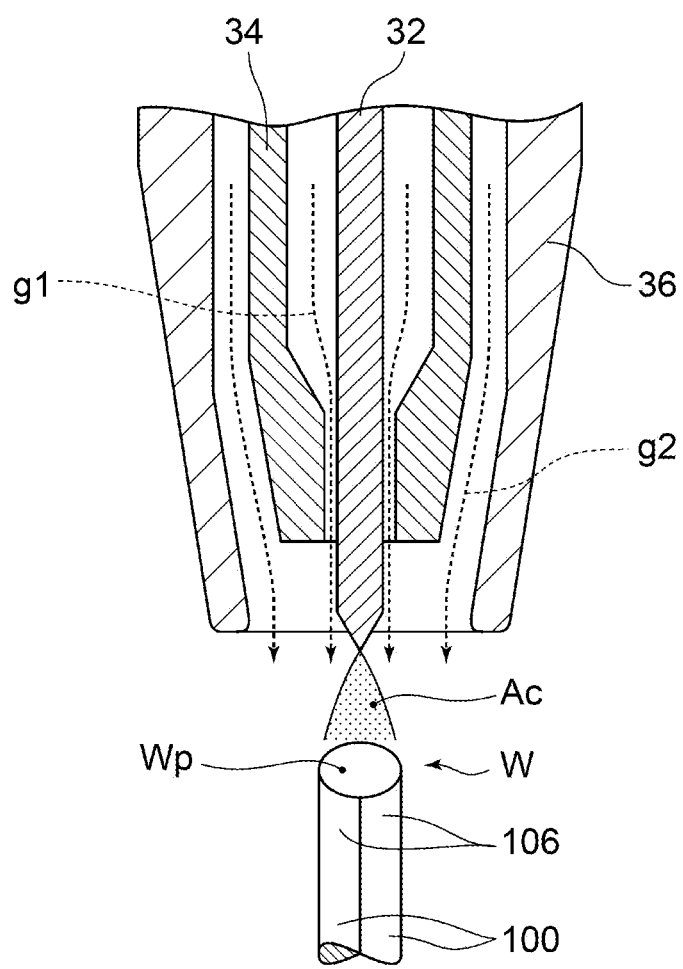
FIG. 9 is a cross-sectional view of the center of the welding torch according to an embodiment.

FIG. 9 shows one configuration example of an internal structure of the center of the welding torch. The welding torch 16 includes a tungsten electrode 32 at the center, and performs arc welding in which a voltage is applied to the tungsten electrode 32 and a welded part W (the adjacent plate outer peripheral edges 106 butted to each other) to form an arc Ac between the tungsten electrode 32 and the welded part W. The welded part W is melted by heat of the arc Ac to form a weld pool Wp, thereby welding the plate outer peripheral edges. A center nozzle 34 is disposed around the tungsten electrode 32, and a center gas g1 for forming the arc Ac is supplied from the inner side of the center nozzle 34 toward the welded part W. Further, a shield nozzle 36 is concentrically disposed on the outer side of the center nozzle 34, and a shielding gas g2 is supplied from the inner side of the shield nozzle 36 toward the welded part W.

In an embodiment, as shown in FIGS. 3 and 4, the pair of movable shield boxes 30 (30a, 30b) are each configured to independently be position-adjustable with respect to the welding torch 16. As shown in FIG. 8, the curvature of the outer peripheral edge 106 is not always the same upstream and downstream of the welded part in the rotation direction. According to the present embodiment, even if the curvature of the outer peripheral edge 106 is different between upstream and downstream of the welded part in the rotation direction, the pair of movable shield boxes 30 (30a, 30b) are independently position-adjustable, and thus can be disposed close to the plate outer peripheral edge 106 upstream and downstream of the welded part. Thus, it is possible to improve the gas shielding effect by the respective movable shield boxes 30 (30a, 30b).

In an embodiment, as shown in FIGS. 3 and 4, the movable shield box 30 is mounted on the stationary shield box 28 to be rotatable about a support shaft 40 disposed along a direction orthogonal to the rotation direction (the direction of the arrow b) of the non-circular plate 100. Thus, the movable shield box 30 is position-adjustable in a direction getting close to or away from the plate outer peripheral edge 106. Thus, the movable shield box 30 can always be disposed in proximity to the plate outer peripheral edge 106 in the entire circumferential region of the plate outer peripheral edge 106, making it possible to improve the gas shielding effect by the movable shield box 30.

In an embodiment, as shown in FIGS. 3 and 4, the interior space s (s1) of the stationary shield box 28 and the interior space s (s2) of the movable shield box 30 form a continuous space. Thus, it is possible to form the wide shield space s (s1+s2) separated from the outside in the periphery of the welding torch 16, making it possible to improve the gas shielding effect in the periphery of the welded part.

In an embodiment, as shown in FIGS. 3 and 4, the movable shield box 30 opens to the stationary shield box 28 and is closed on an opposite side to the stationary shield box 28. Thus, the stationary shield box 28 and the movable shield box 30 internally form the continuous shield space s (s1+s2), making it possible to form the wide shield space s separated from the outside in the periphery of the welding torch 16. Thus, it is possible to improve the gas shielding effect in the periphery of the welded part.

In an embodiment, as shown in FIGS. 3 and 4, the welding device is configured such that an inner surface 42 of the movable shield box 30 facing the outer peripheral edge of the non-circular plate 100 is formed into an arc shape, and a curvature radius of the inner surface 42 is substantially the same as a curvature radius of a portion having a maximum curvature radius of the outer peripheral edge of the non-circular plate 100. Thus, since the curvature radius of the inner surface 42 of the movable shield box 30 coincides with the maximum curvature radius of the plate outer peripheral edge 106, it is possible to minimize a gap between the plate outer peripheral edge 106 and the inner surface 42 of the movable shield box 30 in the entire circumferential region of the plate outer peripheral edge 106. Thus, it is possible to improve the gas shielding effect by the movable shield box 30.

Note that "substantially the same" means that the ratio between the inner surface 42 of the movable shield box 30 and the maximum curvature radius of the outer peripheral edge 106 falls within ±5%. However, the ratio preferably falls within ±3%.

In an embodiment, as shown in FIG. 3, the welding device 10 includes an actuator 44 for enabling position adjustment of the movable shield box 30 with respect to the welding torch 16. Thus, the movable shield box 30 can always be disposed proximately over the entire circumference of the plate outer peripheral edge 106. Thus, it is possible to improve the gas shielding effect by the movable shield box 30.

In an embodiment, as shown in FIG. 3, the actuator 44 includes a servomotor 46, and a ball screw 48 moving vertically in engagement with an output shaft of the servomotor 46. The ball screw 48 has a lower end portion connected to the movable shield box 30 (30a, 30b) via a link bar 50. Since the ball screw 48 is moved vertically by the operation of the servomotor 46, the movable shield box 30 (30a, 30b) rotates in the direction getting close to or away from the plate outer peripheral edge 106 with the support shaft 40 serving as a fulcrum.

Figure 10:
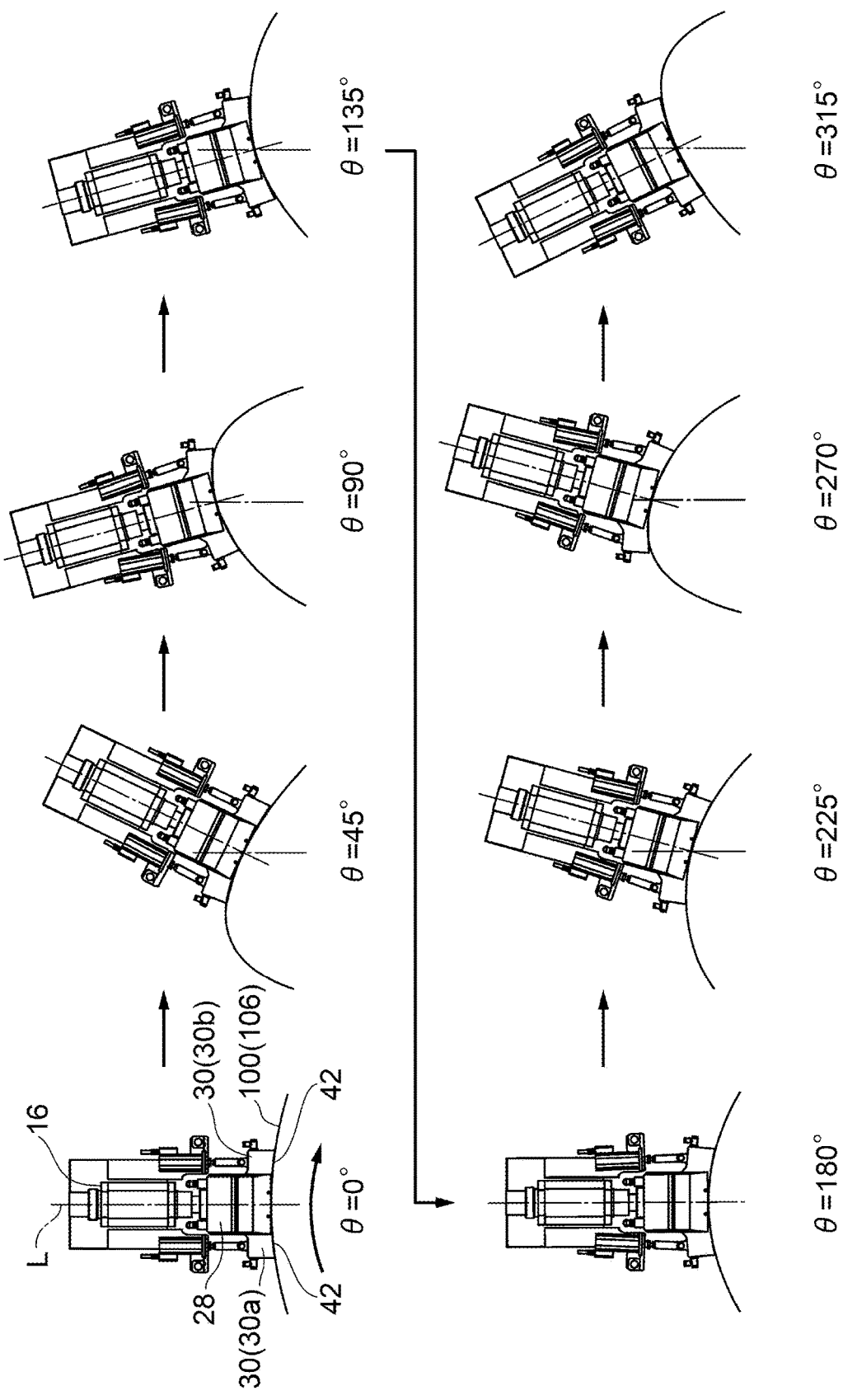
FIG. 10 is a process drawing showing the operation of the above-described welding torch in sequence.

In an embodiment, as shown in FIG. 3, the welding device 10 includes a control part 52 for controlling the operation of the actuator 44 based on a rotation angle θ of the chuck 12. The rotation angle θ refers to an angle at which the non-circular plate 100 rotates clockwise about the rotation center O from a state of the non-circular plate 100 shown in FIG. 2 where θ=0° FIG. 10 shows the welding torch 16 operating in accordance with transition of the rotation angle θ. As shown in FIG. 10, the control part 52 performs position adjustment such that the inner surface 42 of the movable shield box 30 (30a, 30b) approaches the plate outer peripheral edge 106 in accordance with the rotation angle θ. Thus, the operation of the actuator 44 is controlled by the control part 52 based on the rotation angle θ of the chuck 12, the movable shield box 30 can always be disposed in proximity to the plate outer peripheral edge 106. Thus, it is possible to improve the gas shielding effect by the movable shield box 30.

In an embodiment, as shown in FIG. 3, since the control part 52 controls the operation of the servomotor 46, the movable shield box 30 can always be disposed in proximity to the plate outer peripheral edge 106.

In an embodiment, control is performed such that the axis of the welding torch 16 coincides with a normal line L orthogonal to a tangent to the plate outer peripheral edge 106. Thus, position adjustment of the pair of movable shield boxes 30 (30a, 30b) becomes easy.

In an embodiment, as shown in FIGS. 3 to 5, one of the stationary shield box 28 and the movable shield box 30 is configured to be insertable into the other. Thus, the movable shield box 30 can undergo position adjustment without interfering with the stationary shield box 28, and even if the movable shield box 30 moves relatively to the stationary shield box 28, the gap where outside air enters is not formed between the stationary shield box 28 and the movable shield box 30.

In an embodiment, as shown in FIG. 4, at least a part of the movable shield box 30 is configured to be insertable into the stationary shield box 28, and at least a part of the movable shield box 30 is formed into an arc shape centered on the support shaft 40. Thus, since the section of the movable shield box 30 inserted into the stationary shield box 28 is formed into the arc shape centered on the support shaft 40, the movable shield box 30 inserted into the stationary shield box 28 is always maintained at a certain distance from the support shaft 40. Therefore, it is possible to minimize the gap between the stationary shield box 28 and the movable shield box 30, making it possible to suppress that outside air enters from between the stationary shield box 28 and the movable shield box 30.

In an embodiment, as shown in FIG. 4, the stationary shield box 28 and the movable shield box 30 are provided with shielding gas supply nozzles 54 and 56, respectively. Thus, it is possible to uniquely adjust and supply shielding gas amounts needed for the stationary shield box 28 and the movable shield box 30, respectively. Thus, it is possible to improve the gas shielding effect by the stationary shield box 28 and the movable shield box 30.

In an embodiment, the shielding gas supply nozzle 54 has an axis vertically disposed in the stationary shield box 28, and shielding gas outlets are formed at intervals of 90° in the circumferential direction of a nozzle pipe, thereby configuring such that the shielding gas is injected in four directions from the nozzle pipe. Further, the shielding gas supply nozzle 56 is horizontally disposed in the movable shield box 30, and shielding gas outlets are formed at intervals of 90° in top and sides, except for bottom, of a nozzle pipe, thereby configuring such that the shielding gas is injected in three directions of the top and sides of the nozzle pipe. Thus, direct spray to the welded part of the shielding gas injected from the shielding gas supply nozzle 56 is avoided, suppressing disturbance in a welding bead by the shielding gas.

In an embodiment, as shown in FIG. 1, the chuck 12 supports the non-circular plate 100 or the laminated body 102 in the horizontal position. Further, the welding torch 16 is disposed above the non-circular plate 100 or the laminated body 102, and configured to be able to perform downward welding. When the welding torch 16 is disposed in the horizontal position and welds the plate outer peripheral edges 106 of the non-circular plates 100 or the laminated body 102, a subtle disturbance such as sag is likely to occur in the welding bead under the influence of gravity, which is likely to cause poor welding. To cope therewith, in the present embodiment, since the welding torch 16 is disposed in a downward position and performs downward welding, it is possible to resolve disturbance in the welding bead under the influence of gravity.

INDUSTRIAL APPLICABILITY

According to some embodiments, when outer peripheral edges of non-circular plates are welded, it is possible to improve a shielding effect on a welded part by a shielding gas, and thus to prevent a welding defect due to occurrence of a blow hole, welding scale, or the like.

REFERENCE SIGNS LIST

10 Welding device
12 (12a, 12b) Chuck
13 Click
14 (14a, 14b) Support
14a First support
14b Second support
16 Welding torch
18 Rotational shaft
20 (20a, 20b) Stand
22 Base
24 Rail
26 Frame
28 Stationary shield box
30 (30a, 30b) Movable shield box
32 Tungsten electrode
34 Center nozzle
36 Shield nozzle
40 Support shaft
42 Inner surface
44 Actuator
46 Servomotor
48 Ball screw
50 Link bar
52 Control part
54, 56 Shielding gas supply nozzle
100A Non-circular plate
102 Non-circular plate laminated body
102 (102a) Non-circular plate structure
104 Waveform protrusions and recesses
106 Outer peripheral edge
108 Refrigerant flow hole
110 Inner peripheral edge
112 Pair plate
Ac Arc
L Normal line
O Rotation center
W Welded part
Wp Weld pool
c Clearance
g1 Center gas
g2 Shielding gas
s Shield space
s (s1), s (s2) Interior space
θ Rotation angle

The invention claimed is:

1. A welding device for a non-circular plate, comprising:
a chuck for gripping and rotatably supporting a plurality of laminated non-circular plates;
a welding torch for welding outer peripheral edges of adjacent non-circular plates among the plurality of laminated non-circular plates;
a stationary shield box; and
a movable shield box which is position-adjustable with respect to the welding torch so as to form a shield space surrounding the welding torch with the stationary shield box,
wherein the movable shield box is mounted on the stationary shield box to be rotatable around a support shaft such that an interior space of the stationary shield box and an interior space of the movable shield box form a continuous space, and a part of the movable shield box is located inside the interior space of the stationary shield box, and
wherein the support shaft is disposed on a portion of the stationary shield box overlapping with the part of the movable shield box located inside the interior space of the stationary shield box, the part of the movable shield box located inside the interior space of the stationary shield box being movable within the interior space along an arc centered on the support shaft.

2. The welding device for the non-circular plate according to claim 1,
wherein the stationary shield box is disposed so as to surround the welding torch, and
wherein the movable shield box is disposed on an outer side of the stationary shield box relative to the welding torch.

3. The welding device for the non-circular plate according to claim 2,
wherein a pair of movable shield boxes are, respectively, disposed upstream and downstream of the stationary shield box in a rotation direction of the plurality of laminated non-circular plates.

4. The welding device for the non-circular plate according to claim 3,
wherein each of the pair of movable shield boxes is configured to independently be position-adjustable with respect to the welding torch.

5. The welding device for the non-circular plate according to claim 1,
wherein the support shaft extends along a direction orthogonal to a rotation direction of the plurality of laminated non-circular plates.

6. The welding device for the non-circular plate according to claim 1,
wherein the movable shield box opens to the stationary shield box and is closed on an opposite side to the stationary shield box.

7. The welding device for the non-circular plate according to claim 1,
wherein the welding device for the non-circular plate is configured such that an inner surface of the movable shield box facing the plurality of laminated non-circular plates is formed into an arc shape, and a curvature radius of the inner surface is substantially the same as a curvature radius of a portion having a maximum curvature radius of the outer peripheral edges of the plurality of laminated non-circular plates.

8. The welding device for the non-circular plate according to claim 1, comprising an actuator for enabling position adjustment of the movable shield box with respect to the welding torch.

9. The welding device for the non-circular plate according to claim 8, comprising a control part for controlling an operation of the actuator based on a rotation angle of the chuck.

10. The welding device for the non-circular plate according to claim 1,
wherein the support shaft extends along a direction orthogonal to a rotation direction of the plurality of laminated non-circular plates, and
wherein at least a part of the movable shield box is formed into an arc shape centered on the support shaft.

11. The welding device for the non-circular plate according to claim 1,
wherein the stationary shield box and the movable shield box are each provided with a shielding gas supply nozzle.

12. The welding device for the non-circular plate according to claim 1,
wherein the chuck supports the plurality of laminated non-circular plates in a horizontal position, and
wherein the welding torch is disposed above the plurality of laminated non-circular plates and configured to be able to perform downward welding.

13. A producing method for a non-circular plate structure, comprising:
a positioning step of performing positioning by laminating at least two sets of pair plates, each of which is constituted by a pair of non-circular plates joined such that outer peripheral edges thereof are superimposed in a front view, such that the outer peripheral edges of the non-circular plates are butted between the two sets of pair plates;
a welding step of welding, with a welding torch, the outer peripheral edges butted to each other, while rotating the at least two sets of pair plates in a circumferential direction of the pair plates; and
a shield step of shielding a periphery of the welding torch by a stationary shield box for the welding torch and a movable shield box which is position-adjustable with respect to the welding torch, in the welding step,
wherein the movable shield box is mounted on the stationary shield box to be rotatable around a support shaft such that an interior space of the stationary shield box and an interior space of the movable shield box form a continuous space, and a part of the movable shield box is located inside the interior space of the stationary shield box, and
wherein the support shaft is disposed on a portion of the stationary shield box overlapping with the part of the movable shield box located inside the interior space of the stationary shield box, the part of the movable shield box located inside the interior space of the stationary shield box being movable within the interior space along an arc centered on the support shaft.

14. A welding device for a non-circular plate, comprising:
a chuck for gripping and rotatably supporting a plurality of laminated non-circular plates;
a welding torch for welding outer peripheral edges of adjacent non-circular plates among the plurality of laminated non-circular plates;
a stationary shield box; and
a movable shield box which is position-adjustable with respect to the welding torch so as to form a shield space surrounding the welding torch with the stationary shield box,
wherein the movable shield box is mounted on the stationary shield box to be rotatable around a support shaft disposed along a direction orthogonal to a rotation direction of the plurality of laminated non-circular plates,
wherein an interior space of the stationary shield box and an interior space of the movable shield box form a continuous space, and
wherein the support shaft is disposed on a position where the interior space of the stationary shield box and the interior space of the movable shield box overlap with each other when viewed in an extending direction of the support shaft, a part of the movable shield box being movable within the interior space of the stationary shield box along an arc centered on the support shaft.

15. The welding device for a non-circular plate according to claim 14, wherein the stationary shield box has a cutout on a side surface of the stationary shield box facing the movable shield box, the cutout being for receiving the movable shield box.

16. The welding device for a non-circular plate according to claim 15, wherein the movable shield box comprises:
a connecting part that is located inside the interior space of the stationary shield box and is connected to the stationary shield box via the support shaft; and
an arc-shaped part that extends from an inside to an outside of the interior space of the stationary shield box so as to pass through the cutout of the stationary shield box, the arc-shaped part having an arc shape centered on the support shaft.

17. The welding device for a non-circular plate according to claim 16, wherein the cutout has a curved surface facing the arc-shaped part of the movable shield box.

18. The welding device for a non-circular plate according to claim 1, wherein a portion of the interior space of the movable shield box is disposed within the interior space of the stationary shield box, and a size of the portion of the interior space of the movable shield box disposed within the interior space of the stationary shield box changes as a position of the movable shield box is adjusted with respect to the welding torch.

* * * * *